United States Patent Office 2,950,335
Patented Aug. 23, 1960

2,950,335

PREPARATION OF DIALKYL SUBSTITUTED AROMATIC COMPOUNDS

Robert H. Rosenwald, Western Springs, and Edward H. Valance, Oak Park, Ill., assignors, by mesne assignments, to Universal Oil Products Company, Des Plaines, Ill., a corporation of Delaware No Drawing. Filed Sept. 22, 1958, Ser. No. 762,236

11 Claims. (Cl. 260—671)

This application relates to a process for preparing dialkyl substituted aromatic compounds and particularly to a process for preparing para-substituted aromatic compounds. More particularly yet the invention is concerned with the alkylation of alkyl substituted aromatic compounds in which the added alkyl substituent is placed in a position para to the original alkyl substituent on the ring.

The increased use of terephthalic acid as an intermediate in the preparation of synthetic fibers of the glycol-terephthalic type has increased the demand for para-substituted dialkyl aromatic hydrocarbons such as para-xylene, para-diethylbenzene, para-dipropylbenzene, para-diisopropylbenzene, etc., from which the terephthalic acid is prepared. One important source of terephthalic acid is para-xylene, however, the separation of para-xylene from its ortho- and meta-isomers has been relatively expensive due to difficulties encountered in the process involving the separation of the aforementioned isomers. For example, one method for preparing para-xylene from ethylbenzene and isomers of said para-xylene is to subject the mixture (o-xylene, m-xylene, p-xylene and ethylbenzene) to fractional distillation. However, inasmuch as para-xylene, meta-xylene and ethylbenzene all boil within a 3° C. range of each other, separation into the various components by fractional distillation is relatively difficult to accomplish.

One method of operation is to distill out the ortho-xylene which has a boiling point of approximately 5 to 6° C. above that of the other three components of the mixture. The para- and meta-xylene along with the ethylbenzene will then be separated into several fractions, and para-xylene is then separated out by crystallization from cuts containing the highest percentage. Another method of separating the para-xylene from the unwanted isomers is to displace the eutectic compositions of para- and meta-xylenes by the addition of a co-crystallizing agent such as carbon tetrachloride followed by cooling, the para-xylene and carbon tetrachloride thereby separating out of the mixture, and thereafter recovering said para-xylene by fractional distillation of the para-xylene-carbon tetrachloride mixture.

Still another method of recovering para-xylene is to partially sulfonate the mixture, separate the unsulfonated layer from the reaction mixture and crystallize the para-xylene from the mixture by lowering the temperature.

However, the use of para-xylene as a starting material for the production of terephthalic acid has certain disadvantages inasmuch as the oxidation of the para-xylene to the desired terephthalic acid is not a single step in some of the processes which are in use commercially since the second methyl group is oxidized with considerable difficulty. Therefore it is advisable to obtain para-disubstituted benzenes in which the alkyl groups are easily oxidizable to the desired terephthalic acid. In this respect it has been found that diisopropyl derivatives of benzene oxidize more readily and with less effort than do the dimethyl substituted benzenes. Another advantage in starting with diisopropylbenzene is that the para-isomers can be readily isolated from an alkylation mixture containing the ortho-, meta- and para-diisopropylbenzenes by a fractionation process, inasmuch as the first two named isomers distill at a lower temperature than do the para-isomers, the difference in boiling points being approximately 7° C. For example, o-diisopropylbenzene has a boiling point of 203.75° C., m-diisopropylbenzene has a boiling point of 203.18° C., while p-diisopropylbenzene has a boiling point of 210.37° C.

It is therefore an object of this invention to provide a relatively inexpensive process for obtaining para-dialkyl substituted aromatic compounds.

A further object of this invention is to provide a process for preparing para-dialkyl substituted aromatic compounds by using a catalyst which will provide a greater yield of the desired positioned isomer.

One embodiment of this invention resides in a process for the alkylation of an alkylatable aromatic compound which comprises alkylating said compound with an alkylating agent at alkylating conditions in the presence of a catalyst consisting of a boria-alumina mixture, and recovering the desired isomers of the dialkyl substituted aromatic compounds.

A further embodiment of the invention is found in a process for the alkylation of an alkylatable aromatic hydrocarbon which comprises alkylating said hydrocarbon with an alkylating agent at a temperature in the range of from about 125° to about 300° C. in the presence of a catalyst consisting of boria-alumina, and recovering the desired isomers of the dialkyl substituted aromatic hydrocarbon.

A specific embodiment of the invention is found in a process for the alkylation of cumene which comprises alkylating said cumene with propylene in the presence of a catalyst consisting of boria-alumina at a temperature in the range of from about 160° to about 300° C., and recovering the desired p-diisopropylbenzene.

Other objects and embodiments referring to alternative alkylatable aromatic hydrocarbons and alternative alkylating agents will be found in the following further detailed description of the invention.

As hereinbefore set forth it has now been found that substantially greater yields of the desired position isomer of a dialkyl substituted aromatic compound may be obtained by alkylating an aromatic compound such as an aromatic hydrocarbon or an alkyl substituted aromatic hydrocarbon with an alkylating agent in the presence of certain metal oxide catalysts. Heretofore the isomer distribution resulting from the alkylation of an aromatic hydrocarbon or the alkylation of an alkyl substituted aromatic hydrocarbon has not been satisfactory for the recovery of a para-substituted dialkyl aromatic compound if this is the desired position isomer. For example, the isopropylation reaction of cumene is known to give products in which the extent of meta-substitution is about equal to that of para-substitution of the second isopropyl radical. However, it has now been discovered that the alkylation process can be altered by the use of a catalyst which shows a strong affinity as indicated by absorption for the aromatic compound to be alkylated. In particular, we have found that the catalyst which gives the maximum yield of the desired position isomer which, in this case, comprises the para-isomer of the dialkyl substituted aromatic hydrocarbon, comprises a boria-alumina mixture. As will be shown subsequently in the specification this particular catalyst exhibits an ability to catalyze the alkylation of an alkyl substituted aromatic hydrocarbon with an alkylating agent to form para-substituted dialkyl aromatic hydrocarbons far in excess of the ability of other acid-acting catalysts such as thoria-alumina, silica-zirconia, phosphoric acid, siliceous adsorbent composites, zinc chloride-alumina, etc.

Many different classes of compounds can be alkylated by the process of this invention using the particular boria-alumina catalyst. Among such classes of compounds are aromatic hydrocarbons, aromatic amines, aromatic halogen compounds, aromatic ketones, the salts of phenols, the salts of aromatic carboxylic acids, etc. Among these classes of alkylatable aromatic compounds, aromatic hydrocarbons and alkyl substituted aromatic hydrocarbons are preferred. The remaining alkylatable compounds are not necessarily equivalent so that different reaction conditions may be necessary to involve them in reaction with the alkylating agents hereinafter set forth in the presence of the catalyst of this invention. Many aromatic hydrocarbons are utilizable as alkylatable compound starting materials. The preferred aromatic hydrocarbons comprise monocyclic aromatic hydrocarbons such as benzene, toluene, ethyl benzene, n-propylbenzene, isopropyl benzene (cumene), n-butyl benzene, etc. Higher molecular weight alkyl aromatic hydrocarbons are also suitable such as those produced by the previous alkylation of aromatic hydrocarbons with olefinic polymers. Such products are referred to in the art as alkylate, and include hexyl benzene, heptyl benzene, octyl benzene, nonyl benzene, decyl benzene, undecyl benzene, dodecyl benzene, etc. Very often alkylate is obtained as a high boiling fraction in which the alkyl group attached to the aromatic hydrocarbon varies in size from $C_9$ to $C_{18}$.

It is also contemplated within the scope of this invention that other suitable utilizable aromatic hydrocarbons which may be used include those in which two or more aryl groups such as diphenyl, naphthalene, anthracene, phenanthrene, indene, etc., alkyl substituted polycyclic aromatic hydrocarbons such as 1-methylnaphthalene, 2-methylnaphthalene, 1-ethylnaphthalene, 2-ethylnaphthalene, 1-n-propylnaphthalene, 1-isopropylnaphthalene, 1-methylanthracene, 1-ethylanthracene, 1-n-propylanthracene, 1-isopropylanthracene, 2-methylanthracene, 2-ethylanthracene, 2-n-propylanthracene, 2-isopropylanthracene, 1-methylphenanthrene, 1-ethylphenanthrene, 1-n-propylphenanthrene, 1-isopropylphenanthrene, etc.

Furthermore, by the term alkylatable aromatic compound it is also meant to include not only benzene derivatives, naphthalene derivatives and the like, but also all aromatic compounds containing a stable ring or nucleus such as is present in benzene and which possesses unsaturation in the sense that benzene does.

Consequently, it can be seen that the term "aromatic compound" in the sense in which it is used in this specification and in the appended claims, includes not only carbocyclic compounds, but also heterocyclic compounds having a stable nucleus. The carbocyclic compounds may have a benzene, naphthalene, anthracene, etc., nucleus. The heterocyclic compounds may have a pyridine, furan, thiophene, pyrrole, pyrazole, etc., nucleus. In addition, the aromatic compounds contemplated for use in the process of the present invention may contain both a carbocyclic and a heterocyclic ring such as is formed in indole and carbazole. Also the aromatic compounds may contain both a benzene nucleus and a saturated ring such as is formed in indole and carbazole. In addition the aromatic compounds may contain both a benzene nucleus and a saturated ring such as is found in tetralin and in indan.

Although the preferred starting materials of the present invention comprise alkyl substituted aromatic hydrocarbons it is also contemplated within the scope of this invention that unsubstituted aromatic hydrocarbons such as benzene, naphthalene, anthracene, phenanthrene may be used. When an unsubstituted aromatic hydrocarbon is to be alkylated with an alkylating agent to provide a dialkyl substituted aromatic hydrocarbon in which the alkyl substituents are in the para position, such as the alkylation of benzene with propylene to provide para-diisopropylbenzene or the alkylation of benzene with ethylene to provide para-diethylbenzene, the amount of olefin present in the reaction is increased. For example, when an alkyl substituted aromatic hydrocarbon such as toluene, cumene, etc., is alkylated the ratio of aromatic hydrocarbon to alkylating agent is in the range of from about 4:1 to about 10:1 or more. However, the ratio of unsubstituted aromatic hydrocarbon to olefin will be in the range of from about 1:1 to about 2:1. As hereinbefore stated, the preferred reaction or condensation of the present process involves the alkylation of an alkyl substituted aromatic hydrocarbon with an olefin rather than the alkylation of unsubstituted aromatic hydrocarbon with an olefin, the latter reaction being susceptible to a greater amount of side reactions which may occur during the desired dialkylation, said side reactions including a greater polymerization of the alkylating agent.

Suitable alkylating agents which may be utilized in this process are unsaturated compounds including monoolefins, diolefins and polyolefins. The preferred unsaturated compounds are olefinic hydrocarbons which comprise monoolefins having one double bond per molecule and polyolefins which have more than one double bond per molecule. Monoolefins which may be utilized are either normally gaseous or normally liquid and include ethylene, propylene, 1-butene, 2-butene, 1-pentene, 2-pentene, 3-pentene, 1-hexene, 2-hexene, 3-hexene and higher normally liquid olefins, the latter including various olefin polymers having from about 6 to about 18 carbon atoms per molecule. In addition it is also contemplated within the scope of this invention that cycloolefins such as cyclopentene, cyclohexene, etc., various alkyl cycloolefins such as methylcyclopentene, methylcyclohexene, etc., may also be utilized but generally not under the same conditions of operation applying to the non-cyclic olefins. The polyolefinic hydrocarbons utilizable in the process of the present invention include conjugated diolefins such as butadiene and isoprene as well as non-conjugated diolefins and other polyolefinic hydrocarbons containing more than 2 double bonds per molecule.

As hereinbefore set forth the alkylation of the aromatic compound with an alkylating agent is effected in the presence of a certain mixture of metal oxides. The alkylation or condensation is usually effected at elevated temperatures ranging from about 100° to about 350° C. or more and preferably at a range of from about 160° to about 300° C. In addition, pressures ranging from atmospheric to about 100 atmospheres or more may be used, the particular amount of pressure being dependent upon the reactants used in the particular condensation reaction and being sufficient to maintain a substantial portion of the reactants in the liquid phase if this type of reaction phase is desired. As hereinbefore stated, the most effective catalyst which gave the highest percentage of the desired positioned isomer, which in this instance is the para-isomer, comprises a boria-alumina mixture. One method of preparing this particular catalyst is to soak alumina spheres in a boric acid solution at an elevated temperature for a predetermined period of time. At the end of this period of time the spheres are allowed to cool, are dried and then calcined at a relatively high temperature for another predetermined period of time.

The process of this invention may be effected in any suitable manner and may comprise either a batch or a continuous type operation. For example, when a batch type operation is used a quantity of the starting materials comprising in this instance an aromatic compound is placed in a suitable apparatus such as a rotating autoclave along with the boria-alumina catalyst. The alkylating agent comprising the unsaturated hydrocarbon, if in gaseous form, is charged to the autoclave which is thereafter heated to a predetermined temperature and maintained thereat for the desired residence time. If, however, the alkylating agent is in normally liquid form said agent may be added to the autoclave before the same is sealed and heated to the reaction temperature. The process may be carried out at pressures ranging from about atmospheric to about 100 atmospheres or more. However, the pressure does not appear to be a critical variable in the process inasmuch as the condensation may be carried out in either a liquid or vapor phase. Thus, the pressure utilized may be selected purely from the most advantageous pressure based upon economic considerations and upon the stability of the particular reactants which are charged to the process under the necessary processing conditions. At the end of the desired residence time the apparatus and contents thereof are cooled to room temperature, any unreacted gases are vented or stabilized by heating the apparatus in boiling water, the reaction mixture is filtered to remove catalyst and the desired reaction product comprising a dialkyl aromatic compound is separated from any unreacted starting materials and recovered by conventional means such as, for example, by fractional distillation, crystallization, etc.

The process of this invention may also be effected in a continuous type operation. The catalyst comprising a boria-alumina mixture is particularly suitable for a fixed bed type of operation. In this type of operation the catalyst is disposed as a fixed bed in a reaction zone which may comprise either an unpacked vessel or coil or which may be lined with an adsorbent packing material such as dehydrated bauxite, fire brick, alumina and the like. The reaction zone is maintained at the proper operating conditions of temperature and pressure while the reactants comprising the aromatic compound of the type hereinbefore set forth and the alkylating agent are continuously charged thereto through separate lines or, if so desired, the reactants may be admixed prior to entry into said reaction zone and charged thereto in a single stream. In carrying out the process of this invention in a continuous manner liquid hourly space velocities (the volume of liquid hydrocarbon charged to the reactor per volume of catalyst per hour) may be varied within a relatively wide range of from about 0.1 to about 20 or more, a preferred range being from about 0.1 to about 10. The desired reaction product is continuously withdrawn from the reaction zone, separated from the reactor effluent and purified by conventional means hereinbefore set forth while said effluent is recharged to the reaction zone as a portion of the feed material.

Other continuous types of operation which may be used in this process include the compact moving bed type of operation in which the bed of catalyst and the reactants pass either concurrently or countercurrently to each other in the reaction zone, the fluidized type of operation in which the catalyst is maintained in a state of turbulence under hindered settling conditions and the slurry type process in which the catalyst is carried into the reaction zone as a slurry in one of the reactants.

The following examples are given to illustrate the process of the present invention, which, however, are not intended to limit the generally broad scope of the present invention in strict accordance therewith.

*Example I*

Fifty grams of a boria-alumina catalyst and 480 g. of cumene were placed in the glass liner of a 3 liter rotating bomb. The catalyst was prepared by soaking one kilogram of wet alumina spheres in a solution of 209 grams of boric acid in 800 cc. of water at a temperature of 90–100° C. The spheres were cooled, filtered and allowed to dry for a period of about 16 hours. Following this the catalyst was calcined for a period of 1 hour at a temperature of about 450° C.

Forty-four g. of propylene which was previously cooled until it reached a liquid state were added to the liner, which was then sealed into the bomb. The bomb was heated to a temperature of about 200° C. and maintained thereat for a period of about 4 hours. At the end of this time the bomb liner was stabilized to remove unreacted proplyene by heating said liner in water at temperature in the range of from about 90° to about 100° C. for a period of about one hour. The amount of propylene which was reacted was determined by the increase in the weight of the liner after stabilization. It was found that in this example 38 g. (0.91 mole) of propylene reacted. At the end of this time the reaction mixture was recovered and filtered to remove the catalyst. The catalyst was washed with an organic solvent to remove any liquid adhering thereto, after which the filtrate and washings were combined. The excess cumene was removed by distillation on a packed column. The forerunnings representing side reactions such as polymerization and dealkylation, and comprising that portion of the reaction mixture boiling below about 150° C. were also removed by distillation. The bottoms boiling above about 190° C. were recovered and subjected to infra-red analysis. 130.4 g. of diisopropylbenzene was recovered, the composition of said diisopropylbenzene fraction representing 11% ortho-, 29% meta- and 60% para-diisopropylbenzene. This corresponded to a yield of 10% ortho-, 25% meta- and 53% para-diisopropylbenzene based on the propylene charged.

*Example II*

In this experiment 50 g. of boria-alumina catalyst and 480 g. of cumene were placed in a glass liner of a rotating bomb. Forty-two g. of propylene which was previously cooled to a liquid state were added to the liner which was then sealed into the bomb. The bomb was heated to a temperature of 240° C. and maintained thereat for a period of about 4 hours. At the end of this time the propylene was stabilized by heating the liner in water at a temperature in the range of from about 90° to about 100° C. for a period of about one hour, after which the reaction mixture was recovered, filtered to remove the catalyst and the catalyst was washed with an organic solvent to remove any liquid adhering thereto. The washings and the reaction mixture were combined, the excess cumene removed by distillation, the forerunnings (the fraction boiling below about 150° C.) were removed and the bottoms recovered. The bottoms were subjected to fractional distillation and 130.4 g. of diisopropylbenzene fraction was recovered. The diisopropylbenzene fraction was subjected to infra-red analysis and it was found that the composition of the fraction consisted of 9% ortho-, 31% meta- and 60% para-diisopropylbenzene. This amounted to a yield of 9% ortho-diisopropylbenzene, 29% meta-diisopropylbenzene and 55% para-diisopropylbenzene based on the propylene reacted.

*Example III*

To illustrate the operability of the process in a continuous run the following experiment was performed. The continuous flow plant consisted of a pressure double charger for the propane-propylene feed, a graduated glass cylinder charger for the cumene feed, a jacketed reactor and a stabilizer. The reactor which contained 66.2 g. of boria-alumina catalyst was heated to a temperature of about 290° C. and put under a pressure of about 35 atmospheres. The cumene was charged to the reactor at a liquid hourly space velocity of 2.17 and the propane-propylene feed was charged thereto at a liquid hourly space velocity of 0.33, the total being 2.50; the cumene-propylene mole ratio as charged being 10.07. At the end of the reaction time which was about 23 hours in length it was found that all of the propylene had reacted. The reaction product was recovered and subjected to fractional distillation with the diisopropylbenzene isomers accounting for approximately 80% of the reaction mixture. The diisopropylbenzene fraction was subjected to infra-red analysis where it was found that the diisopropylbenzene isomer distribution consisted of 56.5% para-diisopropylbenzene, 35.1% meta-diisopropylbenzene and 8.4% ortho-diisopropylbenzene.

*Example IV*

To illustrate the advantage of using a boria-alumina catalyst over other acid-acting catalysts the following experiment was performed in which the catalyst consisted of polyphosphoric acid composited with a siliceous adsorbent and known in the trade as solid phosphoric acid catalyst. A mixture of 50 g. of this catalyst along with 480 g. of cumene was placed in the glass liner of a 3 liter rotating bomb. Forty-two g. of propylene which was previously cooled to the liquid state were added to the liner which was then sealed into the bomb. The bomb was heated to a temperature of 200° C. and maintained thereat for a period of 4 hours. At the end of this time the contents of the bomb were treated in a manner similar to that set forth in Example I above. 92.4 g. of a diisopropylbenzene mixture was recovered and subjected to infra-red analysis. It was found that this fraction was composed of 29% ortho-diisopropylbenzene, 37% meta-diisopropylbenzene and 34% para-diisopropylbenzene.

*Example V*

An identical experiment was performed to that set forth in Example I using a titania-boria catalyst. In this experiment the catalyst, cumene and propylene, were treated in a manner similar to that set forth in Example I above. The diisopropylbenzene mixture which was recovered at the end of the experiment consisted of 26% ortho-diisopropylbenzene, 32% meta-diisopropylbenzene and 42% para-diisopropylbenzene.

*Example VI*

In this example the catalyst comprised a silica-zirconia mixture. The reaction mixture of 50 g. of this catalyst and 480 g. of cumene were treated in a manner similar to that set forth in Example I with 43 g. of propylene. The reacton product which was recovered consisted of 19% of ortho-diisopropylbenzene, 35% of meta-diisopropylbenzene and 46% of para-diisopropylbenzene.

It is readily apparent that the above Examples I to VI show that the use of a catalyst consisting of a boria-alumina mixture will result in an unexpectedly greater yield of para-diisopropylbenzene which is the desired positioned isomer, while the use of other metal oxide mixtures such as titania-boria, solid phosphoric acid and silica-zirconia as catalysts will give yields of para-diisopropylbenzene which are considerably lower than those recovered by use of the first named catalyst.

*Example VII*

An additional experiment was performed in which toluene was alkylated with propylene using a boria-alumina catalyst. In this experiment 50 g. of the aforementioned catalyst and 460 g. of toluene were placed in the glass liner of a rotating bomb. Forty-two grams (1.0 mole) of propylene which was previously cooled to a liquid state was added to the liner which was then sealed into the bomb. The bomb was then heated to a temperature of 200° C. and maintained thereat for a period of 4 hours. At the end of the reaction time the bomb was treated in a manner similar to that set forth in Example I, that is, the unreacted propylene was stabilized by heating said bomb in water at a temperature of from about 90° to about 100° C. for a period of about one hour. The reaction product was recovered, was filtered to remove the catalyst and subjected to fractional distillation. The alkylate comprising 96.9 g. was subjected to fractional distillation and the cymene fraction was found to be composed of 36% ortho-cymene, 19% meta-cymene and 45% para-cymene.

*Example VIII*

The experiment described in Example VII was repeated using a solid phosphoric acid catalyst. The catalyst, toluene and propylene, were treated in a manner similar to that set forth in the above example. The alkylate was found by infra-red analysis to be composed of 42% ortho-, 27% meta- and 31% para-cymene.

Thus, it is shown that the use of a boria-alumina catalyst in the alkylation of toluene with propylene will result in a greater yield of para-cymene than can be found when using a solid phosphoric acid catalyst.

We claim as our invention:

1. A process for the alkylation of an alkylatable aromatic compound which comprises alkylating said compound with an olefinic hydrocarbon at alklating conditions in the presence of a boria-alumina mixture, and recovering the resultant alkylated compound.

2. A process for the alkylation of an alkylatable aromatic hydrocarbon which comprises alkylating said hydrocarbon with an olefinic hydrocarbon at alkylating conditions in the presence of boria-alumina, and recovering the resultant alkylated aromatic hydrocarbon.

3. A process for the alkylation of an alkylatable aromatic hydrocarbon which comprises alkylating said hydrocarbon with an olefinic hydrocarbon at a temperature in the range of from about 125° to about 350° C. in the presence of boria-alumina, and recovering the resultant alkylated aromatic hydrocarbon.

4. A process for the alkylation of an alkyl substituted benzene hydrocarbon which comprises alkylating said hydrocarbon with an olefinic hydrocarbon at a temperature in the range of from about 125° to about 350° C. in the presence of boria-alumina, and recovering the resultant alkylated benzene hydrocarbon.

5. A process for the alkylation of an alkyl substituted aromatic hydrocarbon which comprises alkylating said hydrocarbon with an olefinic hydrocarbon at a temperature in the range of from about 125° to about 350° C. in the presence of boria-alumina, and recovering the resultant alkylated aromatic hydrocarbon.

6. A process for the alkylation of an alkyl substituted aromatic hydrocarbon which comprises alkylating said hydrocarbon with ethylene at a temperature in the range of from about 125° to about 350° C. in the presence of boria-alumina, and recovering the resultant alkylated aromatic hydrocarbon.

7. A process for the alkylation of an alkyl substituted aromatic hydrocarbon which comprises alkylating said hydrocarbon with propylene at a temperature in the range of from about 125° to about 350° C. in the presence of boria-alumina, and recovering the resultant alkylated aromatic hydrocarbon.

8. A process for the alkylation of an alkyl substituted aromatic hydrocarbon which comprises alkylating said hydrocarbon with n-butylene at a temperature in the range of from about 125° to about 350° C. in the presence of boria-alumina, and recovering the resultant alkylated aromatic hydrocarbon.

9. A process for the alkylation of cumene which comprises alkylating said cumene with ethylene in the presence of boria-alumina at a temperature in the range of from about 125° to about 275° C., and recovering the desired p-ethylisopropylbenzene.

10. A process for the alkylation of toluene which comprises alkylating toluene with propylene in the presence of boria-alumina at a temperature in the range of from about 125° to about 275° C., and recovering the desired p-cymene.

11. A process for the alkylation of cumene which comprises alkylating cumene with propylene in the presence of boria-alumina at a temperature in the range of from about 160° to about 300° C., and recovering the desired p-diisopropylbenzene.

References Cited in the file of this patent

UNITED STATES PATENTS

| | | |
|---|---|---|
| 2,542,190 | Gorin et al. | Feb. 20, 1951 |
| 2,818,452 | Mavity | Dec. 31, 1957 |